Sept. 20, 1966  G. CHI-CHU KUO  3,273,735
VERTICAL LIFT

Filed Nov. 30, 1964  5 Sheets-Sheet 1

FIG. 1.

INVENTOR
GEORGE CHI-CHU KUO
BY Cameron, Kerkam & Sutton
ATTORNEYS

Sept. 20, 1966  G. CHI-CHU KUO  3,273,735
VERTICAL LIFT
Filed Nov. 30, 1964  5 Sheets-Sheet 2

FIG. 2.

INVENTOR.
GEORGE CHI-CHU KUO
BY
Cameron, Kerkam + Sutton
ATTORNEYS

Sept. 20, 1966 G. CHI-CHU KUO 3,273,735
VERTICAL LIFT
Filed Nov. 30, 1964 5 Sheets-Sheet 3

FIG. 3.

INVENTOR
GEORGE CHI-CHU KUO
BY Cameron, Kerkam & Sutton
ATTORNEYS

Sept. 20, 1966        G. CHI-CHU KUO        3,273,735
VERTICAL LIFT
Filed Nov. 30, 1964                    5 Sheets-Sheet 4

INVENTOR
GEORGE CHI-CHU KUO
BY
Cameron, Kerkam & Sutton
ATTORNEYS

Sept. 20, 1966  G. CHI-CHU KUO  3,273,735
VERTICAL LIFT
Filed Nov. 30, 1964  5 Sheets-Sheet 5

INVENTOR
GEORGE CHI-CHU KUO
BY Cameron, Kerkam & Sutton
ATTORNEYS

United States Patent Office  3,273,735
Patented Sept. 20, 1966

3,273,735
VERTICAL LIFT
George Chi-Chu Kuo, Honolulu, Hawaii, assignor to Castle & Cooke, Inc., Honolulu, Hawaii, a corporation of Hawaii
Filed Nov. 30, 1964, Ser. No. 414,691
18 Claims. (Cl. 214—522)

The present invention relates to conveying apparatus and more particularly to a vertical lift for facilitating harvest and loading of freshly picked fruit such as, for example, pineapples.

Pineapple plants are generally grown in large fields where the plants extend in rows. In harvesting pineapples, it has become the practice to traverse the fields with mobile units having boom conveyors which extend across the rows of pineapple plants. The boom conveyor is moved end-wise along the rows of pineapple plants to enable the pineapple pickers to place the ripe pineapples upon the conveyor as they are picked. The pineapples are then transported by the boom conveyor and fed to an elevating mechanism or lift which raises the pineapples to an elevation from which they are discharged to a distributing conveyor.

Conveyors of this general type are well known as shown in the Bainbridge et al. Patent No. 2,576,992. In such conveyors, the elevating mechanism is generally of the inclined type employing endless belts for elevating the picked pineapples from the boom conveyor to the distributing conveyor or receiving station. While these prior art devices are operative for their intended purposes, fruit carried in this manner is subject to damage, because the pineapples are picked at full maturity, in which condition they are easily bruised due to the rolling action along the belt.

To counteract this deficiency, resort has been made to pressure devices which hold the fruit, without rolling, against the inclined, endless belt or to reciprocating vertical lifts having suitable storage containers to hold the fruit during vertical travel. In the former case, special care must be exercised to prevent excess pressure from being applied against the ripened fruit as it is being carried by the lift, while, in the latter case, special unloading mechanisms are required which are generally expensive and complicated. In addition, such lifts generally require more operating space than desired since clearance must be provided for both the up and down travel of the storage containers as well as travel over the top of the sprockets or sheaves.

These and other disadvantages of the prior art devices are overcome by the present invention wherein there is provided harvesting apparatus having a novel vertical lift or elevator for receiving harvested fruit being transported in loose form along a horizontally disposed conveyor and elevating and discharging the harvested fruit to a distributing mechanism which transports the fruit to a storage container. While the invention is especially well adapted for pineapple harvesting apparatus, and is described in relation thereto, it will be readily apparent that the invention is applicable to various situations where it is necesary to elevate articles which are handled in loose form and which are readily susceptible to damage or bruising if allowed to spill over and be subjected to a free fall.

Accordingly, it is a primary object of the present invention to provide an improved vertical lift having a plurality of sets of non-rigid load-carrying members for elevating loose articles without danger of spill-over.

Another object of the present invention is to provide an improved vertical lift having a plurality of sets of non-rigid load-carrying members, each set having a load-carrying platform and a spill-preventing member, the load-carrying platform being disposed in a substantially horizontal load-carrying position and the spill-preventing member being disposed in a position normal thereto during vertical travel for elevating articles conveyed to the lift at its loading station to a discharge station without danger of spill-over.

A further object of the present invention is to provide an improved harvesting conveyor having a vertical lift wherein the non-rigid load-carrying platform and spill-preventing member travel in the same planes during their return from the discharge station to the receiving station so as to occupy a minimum of space.

A further object of the present invention is to provide an improved pineapple harvester having a vertical lift including a plurality of sets of load-carrying members in which the pineapples are automatically loaded from a boom conveyor and automatically discharged to a distributing mechanism without danger of spill-over.

In accordance with one form of the invention there is provided a harvesting machine having a vertical lift conveyor comprising two pairs of endless chains arranged to be continuously driven in the same direction. Each pair of the endless chains has a vertical portion parallel to and spaced from the plane of the vertical portion of the other pair, while other portions of the pairs of endless chains are in the same planes. For elevating the harvested fruit from the lower loading station to the upper discharge station without danger of spill-over, there is provided a plurality of sets of load-carrying members, each set including a load-carrying sling or platform and a spill-preventing member.

In accordance with another feature of the invention, the sets of load-carrying members are spaced from each other when carried between the portions of the pairs of endless chains in spaced planes and are adjacent each other when carried between portions of the pairs of endless chains in the same planes. Further, as each load-carrying member is being carried between the portions of the pairs of endless chains in spaced planes, the load-carrying platform is disposed in a horizontal load-carrying position while the spill-preventing member is disposed normal and adjacent thereto.

These and other features of the present invention will be apparent from the following detailed description of the mechanical structure and mode of operation thereof. While the specification concludes with claims particularly pointing out and distinctly claiming the subject matter regarding the invention, it is believed that the invention will be better understood with reference to the accompanying drawings. However, it is to be expressly understood that these drawings are for the purpose of illustration only, and it is not intended to represent the full scope of the invention which is defined by the appended claims. In the drawings, wherein like reference characters indicate like parts throughout the several views:

Figure 1:
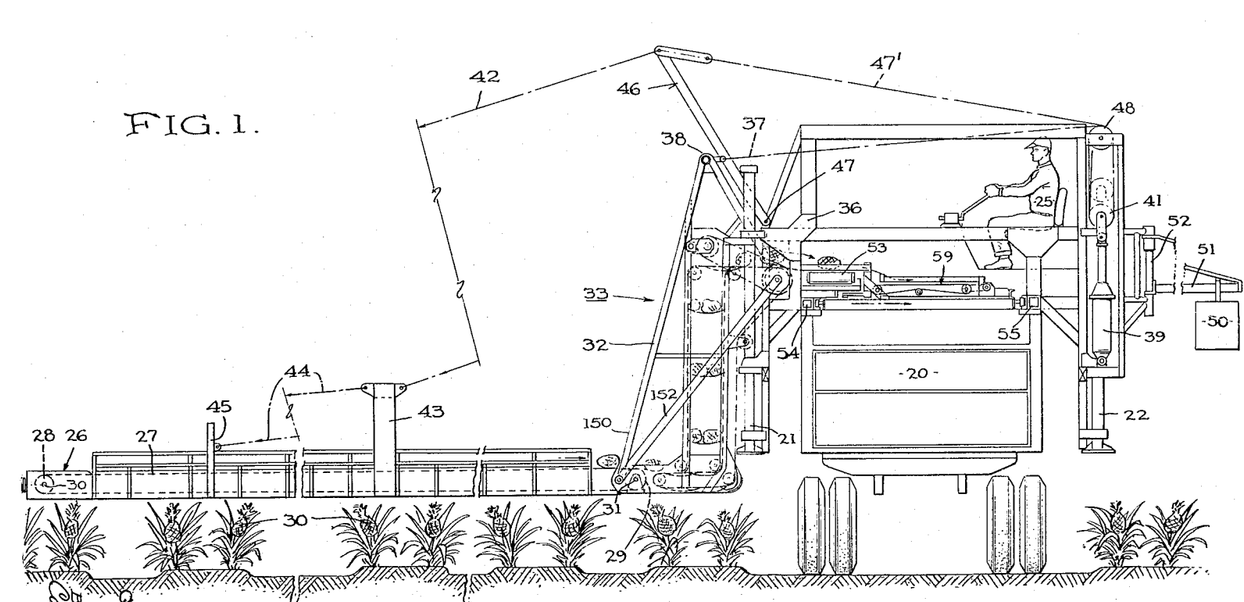
FIG. 1 is a view of the harvester elevator embodying the present invention as seen from the rear of the truck, the harvesting machine being mounted upon the truck and ready for movement down the rows to be harvested.
Figure 2:
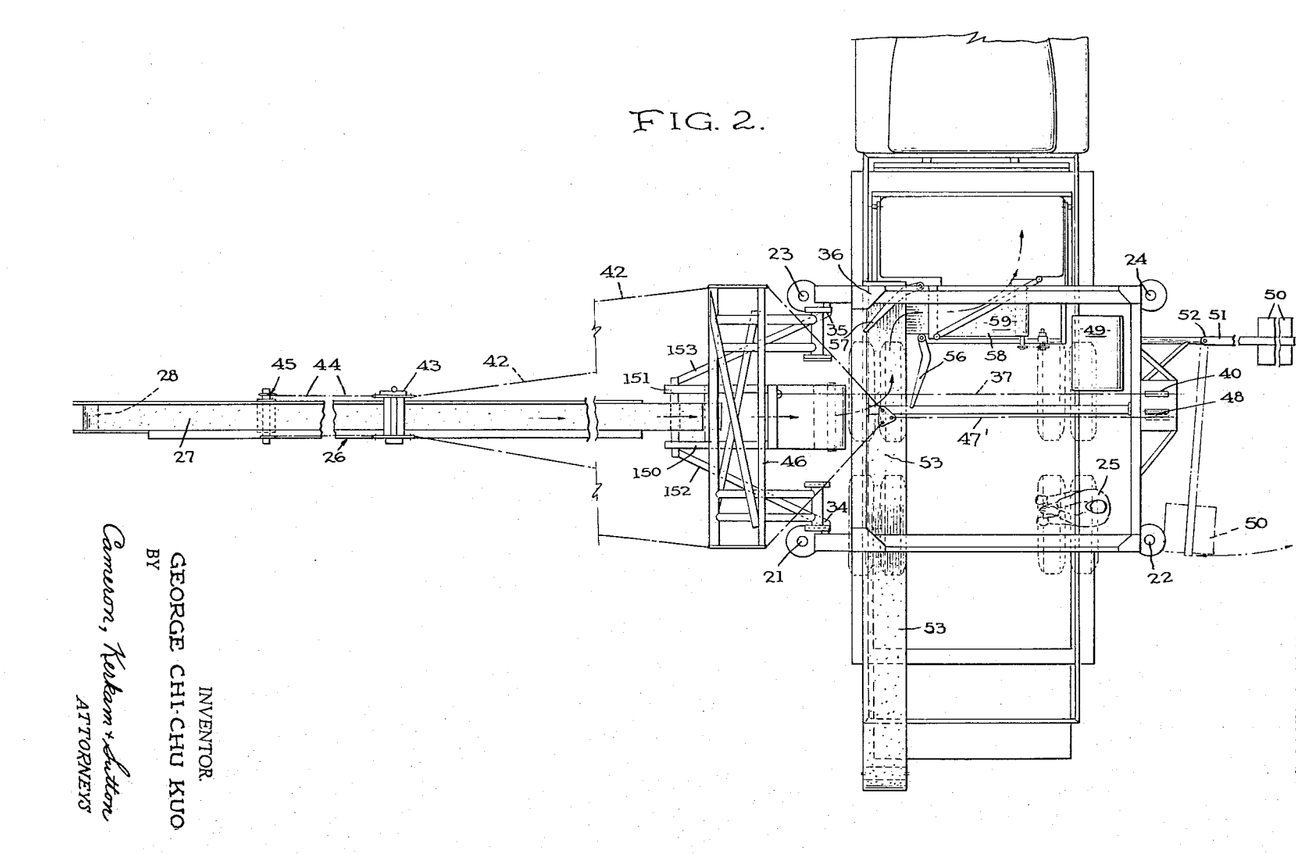
FIG. 2 is a view of the harvester elevator of FIG. 1 taken from above.

Referring now particularly to FIGS. 1 and 2, there is shown a pineapple harvesting conveyor embodying the present invention which is supported on a truck body or superimposed bin generally indicated at 20. The harvesting conveyor is provided with four downward extensible legs 21–24. Advantageously, these legs are hydraulically actuated by an operator 25, and when extended, raise the harvesting conveyor off of truck body or bin 20 so that the truck can be removed, when loaded, and an empty truck placed in position. The legs may then be retracted again so that the body 20 of the empty truck receives the harvesting conveyor and the loading operation is continued under the control of the operator.

A horizontal boom conveyor, generally indicated at 26, is provided with a conveyor belt 27 which extends the length thereof and is endlessly mounted about rollers 28 and 29 supported on shafts 30 and 31. Conveyor 26 may be of any suitable length so as to extend over as many rows of fruit as may be required, and is pivotally supported at one end by boom hooks 154 and 155 to a cross rod 156 on frame 32 of the vertical lift or elevating conveyor 33. Frame 32 is pivoted at 34 and 35 to and at approximately the mid-length of main frame 36 of the harvesting conveyor and is raised and lowered by cable 37 connected thereto at 38. Cable 37 passes over sheave 40 to a hydraulically actuated cylinder and piston, not shown, but similar to piston 39 and associated block 41.

Boom conveyor 26 is supported by cable 42 which extends to upright 43 thereon, and by cable 44 which extends to upright 45 adjacent the outer end of conveyor 26. Cable 42 terminates at the upper end of frame member 46 which is pivoted at 47 to main frame 36 and in turn is raised and lowered by cable 47' which passes over sheave 48 to hydraulically actuated piston and cylinder 39 and block 41.

As is well known in the prior art, a suitable internal combustion engine, generally indicated at 49 and mounted on frame 36 supplies hydraulic fluid under pressure to the various fluid pressure utilizing devices of the machine under the control of operator 25, and particularly cylinder 39 and legs 21–24, as well as the hydraulic motors and pistons to be hereinafter described.

A counterweight 50 for the boom conveyor 26 and vertical lift conveyor 33 may be provided mounted on sleeve boom 51 pivoted at 52 to an extension of frame 36 so that the counterweight may be swung to the dotted position of FIG. 2 when not in use. Adjacent the top of the lift conveyor 33, there is provided a belt conveyor, generally indicated at 53, which extends the length of the truck body 20 along the fore and aft edge thereof. Frame 36 includes spaced side rails 54 and 55 which are held in spaced relation and which rest on the top of truck body or bin 20 when the harvesting machine is in position thereon, as shown in FIG. 1. A pair of spaced rollers, about which endless belt 53 passes, are supported in spaced relationship so as to provide a movable platform for carrying the fruit away from the discharge station of the vertical lift conveyor 33. To this end, one of the rollers is advantageously arranged to be driven in reversible direction by a hydraulically actuated motor, not shown, under the control of operator 25 so that the direction of movement of belt 53 may be selectively chosen as desired. Deflecting means such as deflecting arms 56 and 57 are located above the belt 53 and may be mounted on a carriage to facilitate equal loading over the length of the truck body 20 by a tranversely driven belt 58. The endless belt 53, deflecting arms 56 and 57, transverse belt 58 and the associated drive components form a distributing mechanism, generally indicated by reference numeral 59. Any of the various types of available deflecting and distributor mechanisms well known in the art may be utilized to deliver the fruit from the discharge station of the vertical lift-conveyor to the storage unit. Accordingly, its description will not be described in detail.

Figure 3:
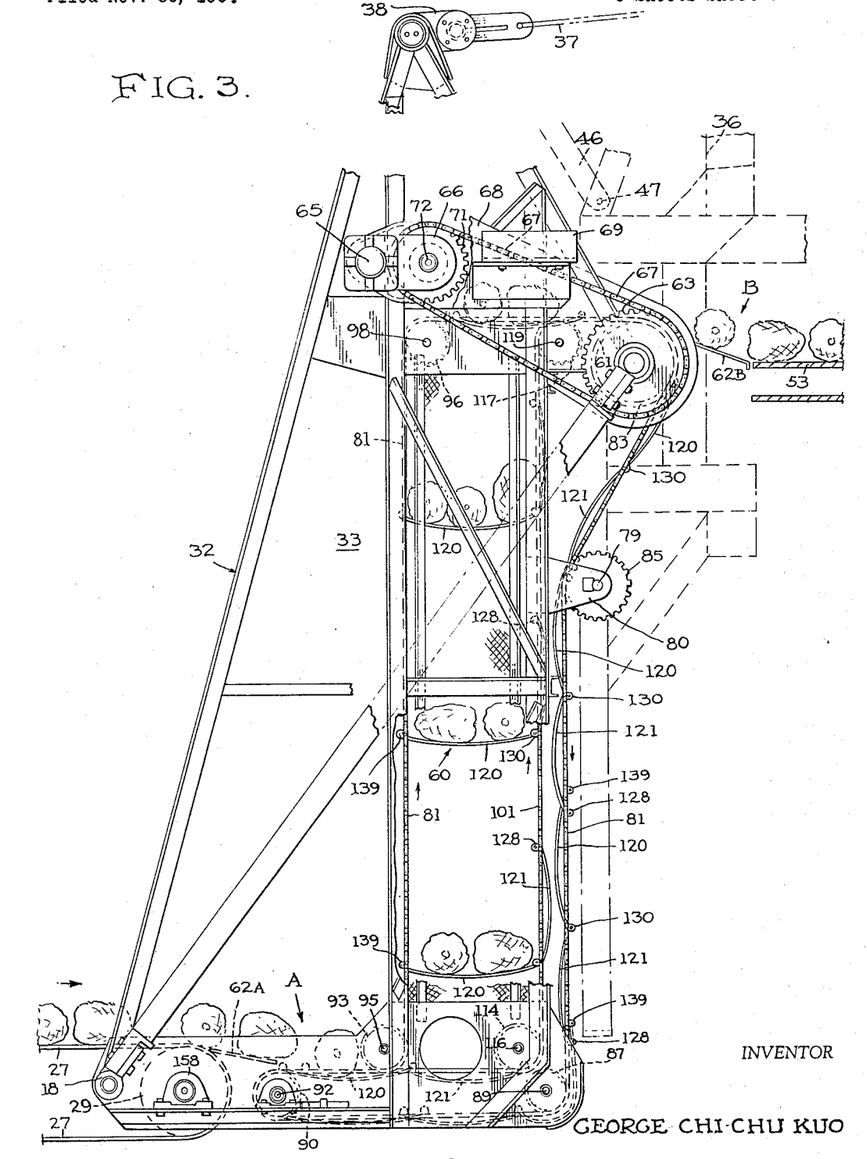
FIG. 3 is a fragmentary rear view of the vertical lift conveyor embodying the invention.
Figures 4, 10:
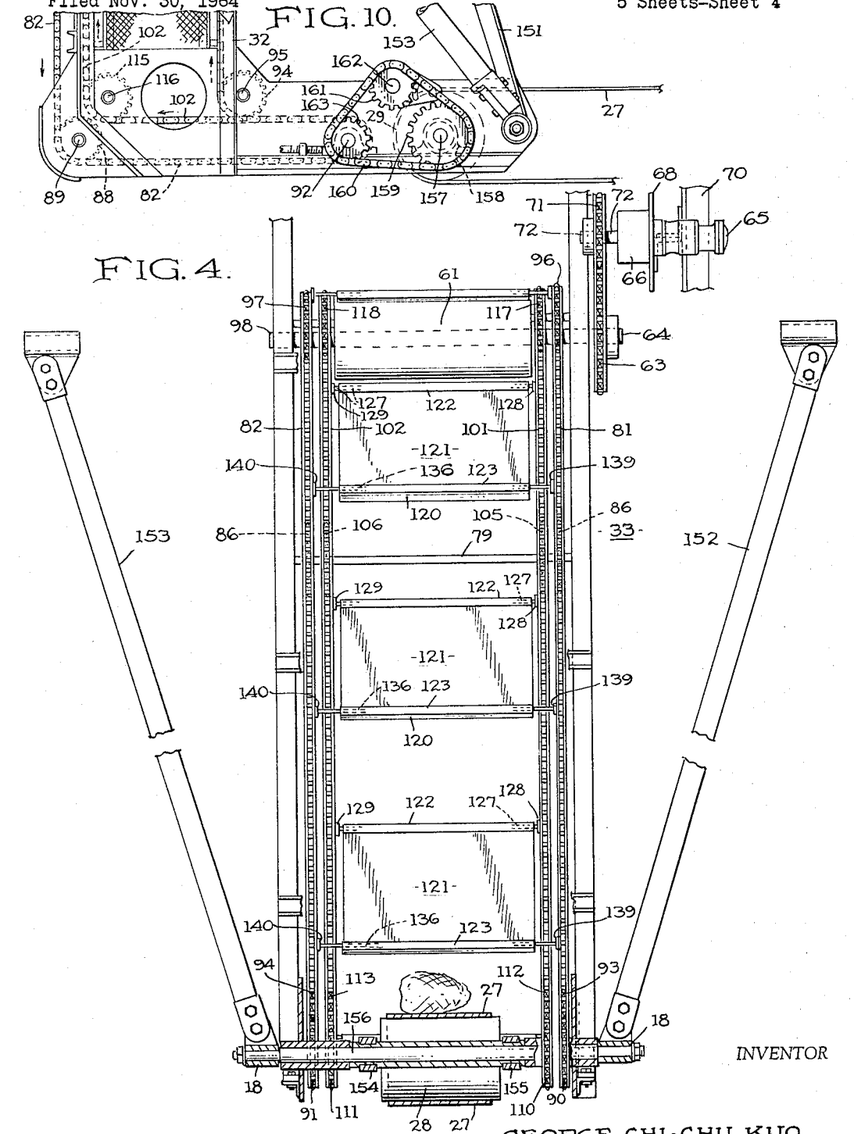
FIG. 4 is a side view of the embodiment shown in FIG. 3.
FIG. 10 is a partial front view of the vertical lift conveyor of FIG. 3 illustrating the drive connection to the boom conveyor.

As is more clearly shown in FIGS. 3 and 4, the vertical lift conveyor 33 of the present invention receives the picked fruit at its lower loading station A as the fruit is discharged from the belt 27 of the horizontal boom conveyor 26 and carries or elevates the fruit by means of non-rigid load-carrying members, generally indicated by the reference numeral 60, to the upper discharge station B. At this point the fruit is discharged onto the endless belt 53 of the distributing mechanism 59 as the load-carrying members are passed over roller 61. Suitable inclined chutes or platforms 62A and 62B are provided at the loading and discharge stations A and B, respectively, to bridge the gaps between the adjacent conveying mechanism and facilitate conveying of the picked fruit to and from the vertical lift conveyor.

Vertical lift conveyor 33 includes a framework, generally indicated by the reference numeral 32, made of structural steel which supports the lift at the desired height for receipt and discharge of the picked fruit. A driving mechanism is supported at the upper end of the framework and includes sprocket 63 keyed to shaft 64 which is driven by the flange mounted hydraulic motor 65 through a gear reducer 66 and chain 67. Gear reducer 66 supports motor 65 and is in turn supported to the main framework through plate 68 and angles 69 and 70.

Chain 67 is in mesh at one end with sprocket 63 mounted on shaft 64 and at its other end with sprocket 71 keyed to the output shaft 72 of gear reducer 66. Gear reducer 66 is conventional and provides a suitable gear reduction between hydraulic motor 65 and output drive shaft 72 so as to reduce the speed of rotation of shaft 64 under the control of operator 25. Motor 65 is arranged to be driven by fluid under pressure supplied by internal combustion engine 49.

Intermediate the upper and lower ends of the vertical lift and displaced inwardly of the shaft 64 is a shaft 79 adjustably supported to framework 32 by flange 80. A pair of endless chains 81 and 82 are in mesh with a pair of sprockets 83, only one of which is shown, keyed to shaft 64. From the sprockets 83, the chains 81 and 82 pass downwardly and inwardly at an angle to the vertical to idler sprockets 85 and 86 keyed to shaft 79, and thence vertically downward to a pair of sprockets 87 and 88 on shaft 89. From there, the chains travel in a horizontal direction around sprockets 90 and 91 mounted on shaft 92 and returned horizontally inwardly under and around sprockets 93 and 94 keyed to shaft 95 supported by framework 32. The path of travel of the chains is then continued vertically upwards over and around sprockets 96 and 97 keyed to shaft 98 and horizontally back to sprockets 83 on drive shaft 64.

A second pair of endless chains 101 and 102 are in mesh with a pair of sprockets (not shown) keyed to drive shaft 64. These latter sprockets and all other sprockets engaged by chains 101 and 102 are positioned inwardly with respect to all sprockets associated with chains 81 and 82, as shown in FIG. 4. In this manner, the second pair of endless chains 101 and 102 form a closed path entirely within the closed path formed by the first pair of endless chains 81 and 82. The chains 81, 82, 101 and 102 are all of exactly the same length and generally travel in the same planes except when elevating the fruit from the loading station A to the discharge station B where the chains travel in parallel, but are in spaced planes.

The second pair of chains 101 and 102 pass downwardly to a pair of sprockets 105 and 106 keyed to shaft 79 and continue vertically downward to a pair of sprockets keyed to shaft 89. From there, the chains 101 and 102 travel in a horizontal direction around sprockets 110 and 111 on shaft 92 and are returned in a horizontally inward direction under sprockets 112 and 113 keyed to shaft 95 to a pair of sprockets 114 and 115 keyed to shaft 116. After passing sprockets 112 and 113 chains 101 and 102 separate from the path of travel of chains 81 and 82.

Up to this point, chains 81, 82, 101 and 102 have been travelling in the same plane. After passing sprockets 112 and 113, chains 81 and 82 travel vertically upward, while chains 101 and 102 continue their horizontal travel to sprockets 114 and 115. After passing around sprockets 114 and 115, chains 101 and 102 are driven vertically and are parallel to but spaced from the chains 81 and 82. Chains 101 and 102 continue vertically upward over and around sprockets 117 and 118 keyed to shaft 119 and back to the drive sprockets on drive shaft 64.

Figure 5:
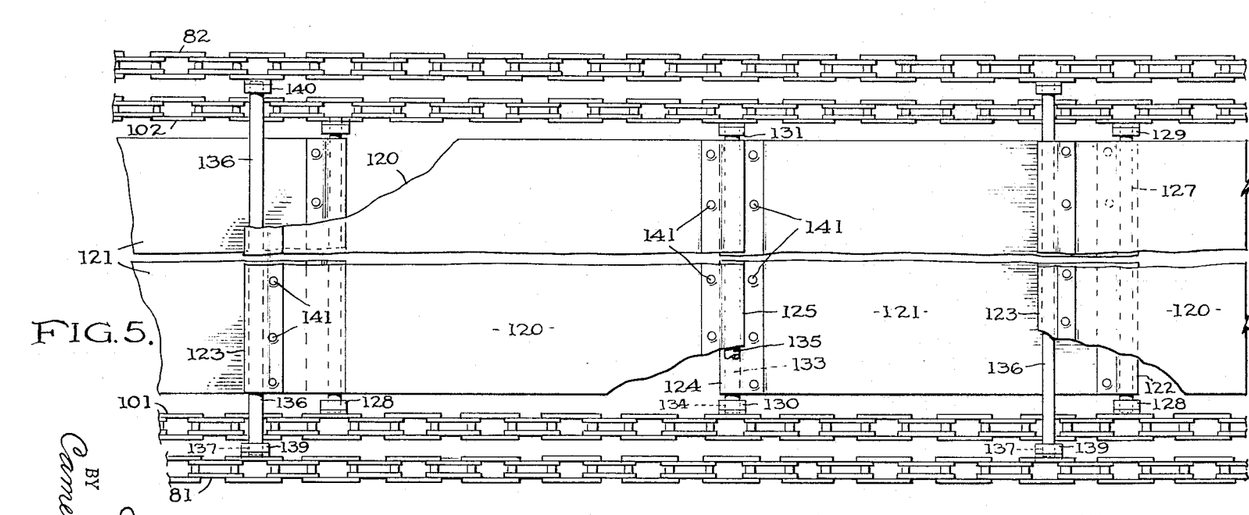
FIGS. 5–9 are detail views of the load supporting and spill-preventing members of the vertical lift conveyor of FIGS. 3 and 4.
Figures 6, 7, 8, 9:
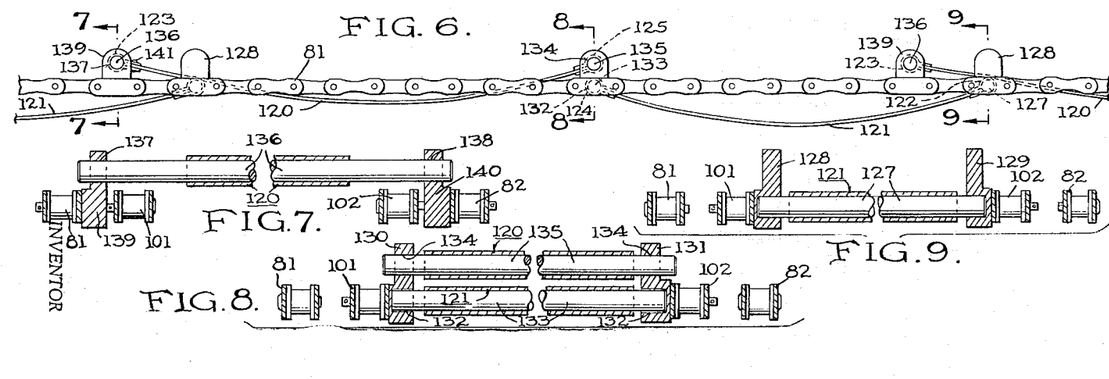

To effect elevation of the fruit from the loading station A to the discharge station B, there is provided between chains 81, 82, 101 and 102 a plurality of sets of load-carrying members generally indicated at 60. Each set comprises two non-rigid supports 120 and 121, each of which is constructed of three-ply neoprene belting or other suitable material of sufficient strength to withstand the load. In the elevating position, that is where each pair of chains is travelling in spaced but parallel planes, support 120 is disposed horizontally, while the other support 121 is disposed vertically forming a plurality of spaced L-shaped carrying platforms. In the other positions, that is when both pairs of chains travel in the same planes, the supports 120 and 121 travel in the same path and are adjacent each other with the leading edge 122 of support 121 and the trailing edge 123 of support 120 overlapping, as more clearly shown in FIGS. 5 and 6.

The leading edge 122 of support 121 is defined as that edge which first approaches the loading station A while the trailing edge 123 of support 120 is defined as that edge which last approaches the loading station A. Thus, referring to FIGS. 5-9, support 121 also has a trailing edge 124 and support 120 has a leading edge 125 which are supported about a common vertical plane. The leading edge of support 121 is carried by bar 127 which is received and supported at its ends by fixtures 128 and 129 conveniently secured to chains 101 and 102, respectively, at points in the same plane.

At a distance along chains 101 and 102, which is advantageously slightly less than the length of the support 121 to cause the support to bow slightly, there are affixed in a similar manner the supporting fixtures 130 and 131. Each fixture 130 and 131 has a lower bore 132 for receiving bar 133 which supports the trailing edge 124 of support 121 and an upper bore 134 which receives the ends of the bar 135 which supports the leading edge 125 of support 120. The trailing edge 123 of support 120 is supported on bar 136, the ends of which are received in bores 137 and 138 of fixtures 139 and 140. Fixtures 139 and 140 are secured to the outer chains 81 and 82 at a distance from fixtures 130 and 131 such as to cause support 120 to bow slightly.

Each of the supports 120 and 121 may be affixed to their corresponding bar supports by turning the end of each support over on itself and riveting or buttoning the end to the inner body portion as shown at 141 thus providing a convenient loop through which the supporting bars may pass and allowing the supports to swing freely about the bars as they change their direction of travel.

Thus, as each set of load-carrying members progresses to the point where the load is elevated, support 121 assumes a vertical position and dumps any articles thereon onto the load support or platform 120. By being retained in this vertical position spill-over from the load-supporting platform 120 is prevented. Since only the side of the lift conveyor where chains 101 and 102 travel upward need be opened, the other sides are conveniently closed by means of mesh screening or other suitable partitions.

Referring now to FIG. 10, there is illustrated the drive connection between the boom conveyor 26 and the lift conveyor 33. Belt 27 extends into the framework between vertical frames 150, 151 and oblique frames 152 and 153 and passes around roller 29. The boom conveyor is pivoted to the main frame 22 through boom hooks 154 and 155 supported on cross rod 156. Roller 29 is supported on shaft 157 which is journalled in flange 158. Shaft 157 has keyed thereto a sprocket 159 which is in mesh with driving chain 160. Chain 160 passes around take-up sprocket 161 keyed to shaft 162 and sprocket 163 keyed to shaft 92 so as to be driven together with chains 81, 82 and 101 and 102.

In operation, with the harvester elevator positioned in the field, hydraulic motor 65 is driven by a pump from the internal combustion engine 49 under the control of the operator 25. The output of motor 65 is taken from the gear speed reducer 66 to drive the main drive shaft 64. As the main drive shaft rotates, chains 81, 82 and 101, 102 in mesh with sprockets carried thereon move in the direction of the arrows (FIG. 1). In this direction, the spill-preventing support 121 always leads the load-supporting platform 120 of each set 60 of load-carrying members. When a spill-preventing member 121 enters the loading area A, both supports 120 and 121 of the set are in a horizontal position and ready to receive fruit from the boom conveyor 26 which is also being driven so as to convey the harvested fruit loaded thereon to the loading station.

As the chains progress, a spill-preventing support 120 enters the area between chains 81, 82 and 101, 102 as the immediately preceding load support begins its ascent. By virtue of the fact that the trailing edge of support 120 overlaps the leading edge of the spill-preventing support 120, there is never any void presented to the fruit either between chains 81, 82 and 101, 102 or at the end of platform 61 where the fruit is discharged onto the load supports. Any fruit that rolls on support 121 will be dumped backward onto the load support 120 as the chains progress and spill-preventing support assumes its vertical position. In this position, both supports 120 and 121 begin their vertical accent and the next load-supporting set 60 moves into position.

Support 121 remains in its position normal to load support 120 during ascent until the top of the lift conveyor is reached. At this point, support 121 begins to assume a substantially horizontal position and is carried around roller 61 along with load support 120. Roller 61 has its upper surface slightly lower than the upper limit of the load support 120 so as to present a slight incline to aid in the discharge of the fruit over platform 62B to the fore and aft belts 53 of the distributing mechanism.

By the present invention there is provided a simple yet effective means for elevating continuously conveyed loose articles from a lower loading station where the articles may be conveniently distributed or stored in a suitable storage unit. Although the invention has been described and illustrated in a single embodiment and in conjunction with a harvesting machine, it will be obvious to those skilled in the art that various modifications may be made. It is therefore intended by the appended claims to cover all such modifications which come within the true spirit and scope of the invention.

What is claimed is:

1. A conveyor for transporting a plurality of loose articles from a first station to a second station comprising a first and a second pair of endless chains adapted to travel in the same direction, each pair of endless chains having a portion in planes parallel to and spaced from each other, other portions of said pairs of said endless chains being in the same plane, a plurality of sets of load-carrying means carried by said pairs of endless chains, said sets being spaced from each other when carried between the portions of the pairs of endless chains in spaced planes and adjacent each other when carried between the portions of the pairs of endless chains in the same plane, each set comprising a load-carrying member for supporting the articles to be transported from the first station to the second station and a spill-preventing member for preventing spill-over of the articles, said spill-preventing member being disposed to assume a load-supporting position for the loose articles when carried between the portions of the pairs of endless chains in the same plane at the first station and means for continuously driving said pairs of endless chains in the same direction.

2. A lift conveyor for elevating a plurality of loose articles from a loading station to a discharge station comprising a first and a second pair of endless chains adapted to travel in the same direction, each pair of endless chains having a vertical portion in one plane parallel to and spaced from the plane of a vertical portion of the other pair, other portions of said pairs of said endless chains being in the same plane, a plurality of sets of load-carrying means carried by said pairs of endless chains, said sets being spaced from each other when carried between the portions of the pairs of endless chains in spaced planes and adjacent each other when carried between the portions of the pairs of endless chains in the same plane, each set comprising a load-carrying member for supporting the articles to be elevated from the loading station to the discharge station and a spill-preventing member for preventing spill-over of the articles, said spill-preventing member being disposed to assume a load-supporting position for the loose articles when carried between the portions of the pairs of endless chains in the same plane at the loading station and means for continuously driving said pairs of endless chains in the same direction.

3. A vertical lift conveyor for elevating a plurality of loose articles from a loading station to a discharge station comprising a first and a second pair of endless chains adapted to travel in the same direction, each pair of endless chains having a vertical portion in one plane parallel to and spaced from the plane of a vertical portion of the other pair, other portions of said pairs of said endless chains being in the same planes, a plurality of sets of load-carrying means carried by said pairs of endless chains, said sets being spaced from each other when carried between the portion of the pairs of the endless chains in spaced planes and adjacent each other when carried between the portions of the pairs of endless chains in the same planes, each set comprising a load-carrying member for supporting the articles to be elevated from the loading station to the discharge station and a spill-preventing member for preventing spill-over of the articles as they are elevated, each load-carrying member of each set being disposed in a horizontal load-carrying position and each spill-preventing member of a corresponding set being disposed normal and adjacent thereto when said sets are carried between the portions of the pairs of endless chains in spaced planes and substantially parallel and adjacent to the spill-preventing member when said sets are carried between the portions of the pairs of endless chains in the same planes such that each spill-preventing member assumes a substantially horizontal load-carrying position for the loose articles at the loading station and means for continuously driving said pairs of endless chains in the same direction.

4. A vertical lift conveyor for elevating a plurality of loose articles from a lower loading station to an upper discharge station comprising a first and a second pair of endless chains adapted to travel in the same direction, each pair of endless chains having a vertical portion in one plane parallel to and spaced from the plane of the vertical portion of the other pair, other portions of said pairs of endless chains being in the same planes, a plurality of sets of load-carrying means carried by said pairs of endless chains for supporting the articles to be raised from the loading station to the discharge station, each set comprising a load-carrying member and a spill-preventing member, said sets being spaced from each other when carried between the portions of the pairs of endless chains in spaced planes and adjacent each other when carried between the portions of the pairs of endless chains in the same planes, each spill-preventing member of a set having its trailing edge adjacent the leading edge of each load-carrying member of the same set such that each spill-preventing member precedes each load-carrying member of the same set whereby each spill-preventing member of each set occupies a load-supporting position at the lower loading station as the immediately preceding load-carrying member begins its ascent between the portions of the pairs of endless chains in spaced planes and means for continuously driving said pairs of endless chains in the same direction.

5. A vertical lift conveyor as set forth in claim 4 wherein the trailing edge of each load-carrying member of a set overlaps the leading edge of a spill-preventing member of the next following set when said sets are carried between the portions of the pairs of endless chains in the same planes so as to prevent any void between each load-carrying member of a set and the spill-preventing member of the next following set.

6. A vertical lift conveyor as set forth in claim 5 wherein each load-carrying member and each spill-preventing member of each set are disposed in a horizontal load-carrying position at the loading station, each spill-preventing member being arranged to begin its ascent as the next following load-carrying member enters the area between the portions of the pairs of endless chains in spaced planes and to occupy a position normal to the next following load-carrying member as said load-carrying member occupies a position completely within the portions of the pairs of endless chains in spaced planes.

7. A vertical lift conveyor for elevating a plurality of loose articles from a lower feeding station to an upper discharge station, a first and a second pair of endless chains adapted to travel in the same direction, the first pair of endless chains forming a closed path entirely within the closed path formed by the second pair of endless chains, the ascending portions of said first pair being parallel to and spaced from the plane of the ascending portions of the second pair, the remaining portions of said pairs being in the same planes, a plurality of sets of load-carrying supports carried by said pairs of endless chains, each set including a load-carrying member supported at opposite ends by said first and second pairs of endless chains respectively, and a spill-preventing member supported at opposite ends entirely by said first pair of endless chains, said sets being spaced from each other when ascending between the portions of the pairs of endless chains in spaced planes and adjacent each other when carried between the portions of the pairs of endless chains in the same planes, said spill-preventing member being disposed to assume a load-supporting position for the loose articles when carried between the portions of said first pair of endless chains in the same planes and means for continuously driving said pairs of endless chains in the same direction.

8. A vertical lift conveyor as set forth in claim 7 wherein each load-carrying member of a set is disposed in a horizontal load-carrying position and each spill-preventing member of a set is disposed normal to and adjacent a corresponding load-carrying member of the same set as said set is carried between the ascending portions of the pairs of endless chains in spaced planes.

9. A vertical lift conveyor as set forth in claim 7 wherein said remaining portions of said pairs of endless chains travel in a plurality of planes, one of said planes being horizontally disposed at the loading station whereby each set prior to its ascent is disposed in a horizontal load receiving position and a second of said planes is disposed in a horizontal plane at the discharge station whereby each set after completion of its ascent is disposed in a substantially horizontal load discharge position.

10. A vertical lift conveyor for elevating a plurality of loose articles from a lower feeding station to an upper discharge station, a first and a second pair of endless chains adapted to travel in the same direction, the first pair of endless chains forming a closed path entirely within the closed path formed by the second pair of endless chains, the ascending portions of said first pair being parallel to and spaced from the plane of the ascending pair, the remaining portions of the second pair being in the same planes, a plurality of sets of load-carrying supports carried by said pairs of endless chains, each set including a load-carrying member supported at opposite ends by said first and second pairs of endless chains respectively, and a spill-preventing member supported at opposite ends entirely by said first pair of endless chains, said sets being spaced from each other when ascending between the portions of the pairs of endless chains in spaced planes and adjacent each other when carried between the portions of the pairs of endless chains in the same planes, each spill-preventing member arranged to precede a corresponding load-carrying member of a set as said sets are driven in the same direction and having its trailing edge adjacent the leading edge of the load-carrying member such that said spill-preventing member occupies a load-supporting position at the loading station as the immediately preceding load-supporting member begins its ascent between the portion of the pairs of endless chains in the spaced planes and means for continuously driving said pairs of endless chains in the same direction.

11. A vertical lift conveyor set forth in claim 10 wherein the trailing edge of each load-carrying member of a set overlaps the leading edge of the spill-preventing member of the next following set when said sets are carried between the portions of the pairs of endless chains in the same planes so as to prevent any void between each load-carrying member and the next following spill-preventing member at the loading station.

12. A harvesting conveyor for conveying fruit from a field being harvested to a storage unit comprising in combination a frame, an elevating conveyor having a loading station and a discharge station, said elevating conveyor being pivoted to said frame, a boom conveyor pivoted to and projecting from said elevating conveyor, means connecting said boom conveyor to said elevating conveyor to drive the boom conveyor so as to convey the harvested fruit loaded into said boom conveyor to the loading station of said elevating conveyor, said elevating conveyor including a pair of endless driving means adapted to travel in the same direction, each pair of endless driving means having a portion in one plane parallel to and spaced from the plane of a corresponding portion of the other pair, other corresponding portions of said pairs of endless driving means in the same planes, a plurality of sets of load-carrying members carried by said pairs of endless driving means, said sets being spaced from each other when carried between the portions of the pairs of endless driving means in spaced planes and adjacent each other when carried between the portions of endless driving means in the same planes, each set comprising a load-carrying sling for supporting the harvested fruit received at the loading station and a spill-preventing member for preventing spill-over of the harvested fruit said spill-preventing member being disposed to assume a load-supporting position for the harvested fruit when carried between portions of the pairs of endless driving means in the same plane at the loading station, means for continuously driving said pairs of endless driving means in the same direction and a distributing mechanism at said discharge station for receiving the discharge fruit from said elevating conveyor and translating said discharged fruit to the storage unit.

13. The harvesting conveyor as set forth in claim 12 wherein each load-carrying sling of a set is disposed in a horizontal load-carrying position and each corresponding spill-preventing member of a set is disposed normal to and adjacent said load-carrying sling as each set is carried between the ascending portions of the pairs of endless chains in spaced planes.

14. A harvesting conveyor for conveying fruit from a field being harvested to a storage unit comprising in combination a frame, an elevating conveyor having a loading station and a discharge station, said elevating conveyor being pivoted to said frame, a boom conveyor pivoted to and projecting from said elevating conveyor, means connecting said boom conveyor to said elevating conveyor to drive the boom conveyor so as to convey the harvested fruit loaded into said boom conveyor to the loading station of said elevating conveyor, said elevating conveyor including a pair of endless driving means adapted to travel in the same direction, each pair of endless driving means having a portion in one plane parallel and spaced from the plane of a corresponding portion of the other pair, other corresponding portions of said pairs of endless driving means being in the same planes, a plurality of sets of load-carrying members carried by said pairs of endless driving means, said sets being spaced from each other when carried between the portions of the pairs of endless driving means in spaced planes and adjacent each other when carried between the portions of endless driving means in the same planes, each set comprising a load-carrying sling for supporting the harvested fruit received at the loading station and a spill-preventing member for preventing spill-over of the harvested fruit, each load-carrying sling of a set being disposed in a horizontal load-carrying position and each corresponding spill-preventing member of a set being disposed normal to and adjacent said load-carrying sling as each set is carried between the portions of the pairs of endless chains in spaced planes, each spill-preventing member of a set having its trailing edge adjacent the leading edge of the load-carrying sling of the same set such that the spill-preventing member precedes said load-carrying sling as said sets are driven in the same direction and occupies a load-supporting position at the loading station of the elevating conveyor as the immediately preceding set begins its ascent between the portions of the pairs of endless means in spaced planes whereby the harvested fruit from said boom conveyor is discharged onto said spill-preventing member and load-carrying sling at the loading station, said spill-preventing member being arranged to cause said harvested fruit loaded thereon to pass to said load-carrying member as said spill-preventing member begins its ascent toward the discharge station, means for continuously driving said pairs of endless driving means in the same direction and a distributing mechanism at said discharge station for receiving the discharged fruit from said elevating conveyor and translating said discharged fruit to the storage unit.

15. A harvesting conveyor set forth in claim 14 wherein the trailing edge of each load-carrying sling of a set overlaps the leading edge of a spill-preventing member of the next following set when said sets are carried between the portions of the pairs of endless driving means in the same plane so as to prevent any void between each load-carrying sling and the next following spill-preventing member at the loading station.

16. A harvesting conveyor for conveying fruit from a field being harvested to a storage unit comprising in combination a frame, a vertical lift conveyor having a loading station and a discharge station, said elevating conveyor being pivoted to said frame, a horizontal belt conveyor pivoted to and projecting from said lift conveyor, means supporting said belt conveyor to said frame, driving means connecting said belt conveyor to said lift conveyor for driving said belt conveyor from said lift conveyor to convey harvested fruit loaded onto the belt to the loading station of said lift conveyor, said lift conveyor comprising a first and second pair of endless chains adapted to travel in the same direction, the first pair of endless chains forming a closed path entirely within a closed path formed by the second pair of endless chains, the ascending portions of said first pair being parallel to and spaced from the plane of the ascending portions of said second pair, the remaining portions of said pairs of endless chains being in the same planes, a plurality of sets of load-carrying members carried by said pairs of endless chains, each set including a load-carrying non-rigid sling supported at opposite ends by said first and second pairs of endless chains, respectively, and a non-rigid spill-preventing member supported at opposite ends entirely by said first pair of endless chains, said spill-preventing member being disposed to assume a load-supporting position for the harvested fruit when carried between portions of the pairs of endless chains in the same plane at the loading station, said sets being spaced from each other when ascending between the portions of the pairs of endless chains in spaced planes and adjacent each other when carried between the portions of the pairs of endless chains in the same planes, a distributing mechanism adjacent said discharge station for translating the elevated fruit to the storage unit and means for continuously driving said pairs of endless chains in the same direction.

17. A harvesting conveyor for conveying fruit from a field being harvested to a storage unit comprising in combination a frame, a vertical lift conveyor having a loading station and a discharge station, said elevating conveyor being pivoted to said frame, a horizontal belt conveyor pivoted to and projecting from said lift conveyor, means supporting said belt conveyor to said frame, driving means connecting said belt conveyor to said lift conveyor for driving said belt conveyor from said lift conveyor to convey harvested fruit loaded onto the belt to the loading station of said lift conveyor, said lift conveyor comprising a first and a second pair of endless chains adapted to travel in the same direction, the first pair of endless chains forming a closed path entirely within a closed path formed by the second pair of endless chains, the ascending portions of said first pair being parallel to and spaced from the plane of the ascending portions of said second pair, the remaining portions of said pairs of endless chains being in the same planes, a plurality of sets of load-carrying members carried by said pairs of endless chains, each set including a load-carrying non-rigid sling supported at opposite ends by said first and second pairs of endless chains, respectively, and a non-rigid spill-preventing member supported at opposite ends entirely by said first pair of endless chains, each spill-preventing member of a set having its trailing edge adjacent to the leading edge of each load-carrying sling of the same set such that each spill-preventing member precedes the load-carrying sling as said sets are driven in the same direction and occupies a load-supporting position at the loading station to receive the fruit from said belt conveyor as the immediately preceding load-supporting sling begins its ascent between the portions of pairs of endless chains in spaced planes, the trailing edge of each load-carrying sling being arranged to overlap the leading edge of a spill-preventing member of the next following set when said sets are carried between the portions of pairs of endless chains in the same planes so as to prevent any void between each load-carrying sling and the next following spill-preventing member, said sets being spaced from each other when ascending between the portions of the pairs of endless chains in spaced planes and adjacent each other when carried between the portions of the pairs of endless chains in the same planes, a distributing mechanism adjacent said discharge station for translating the elevated fruit to the storage unit and means for continuously driving said pairs of endless chains in the same direction.

18. A harvesting conveyor as set forth in the claim 17 wherein each load-carrying sling is disposed in a horizontal load-carrying position and each spill-preventing member is disposed normal to and adjacent to its corresponding load-carrying sling when said sets are carried between the portions of pairs of endless chains in spaced planes and are ascending and each of said spill-preventing members being horizontally disposed and adjacent its corresponding load-carrying sling at the discharge station as each set completes its ascent.

References Cited by the Examiner

UNITED STATES PATENTS

| | | | |
|---|---|---|---|
| 1,914,708 | 6/1933 | Baden | 198—153 |
| 1,938,650 | 12/1933 | Wentz | 198—153 |
| 2,576,992 | 12/1951 | Bainbridge et al. | 214—83.26 |
| 3,184,039 | 5/1965 | Czarnecki | 198—154 |
| 3,223,260 | 12/1965 | Bright | 214—89 X |

GERALD M. FORLENZA, *Primary Examiner.*

ALBERT J. MAKAY, *Examiner.*

UNITED STATES PATENT OFFICE
CERTIFICATE OF CORRECTION

Patent No. 3,273,735　　　　　　　　　　　　　　September 20, 1966

George Chi-Chu Kuo

It is hereby certified that error appears in the above numbered patent requiring correction and that the said Letters Patent should read as corrected below.

Column 9, line 49, after "means" insert -- being --.

Signed and sealed this 29th day of August 1967.

(SEAL)
Attest:

ERNEST W. SWIDER
Attesting Officer

EDWARD J. BRENNER
Commissioner of Patents